S. B. KURTZ.
MOTOR VEHICLE.
APPLICATION FILED DEC. 20, 1907.

1,152,821.

Patented Sept. 7, 1915.
4 SHEETS—SHEET 1.

S. B. KURTZ.
MOTOR VEHICLE.
APPLICATION FILED DEC. 20, 1907.

1,152,821.

Patented Sept. 7, 1915.
4 SHEETS—SHEET 4.

UNITED STATES PATENT OFFICE.

SAMUEL B. KURTZ, OF BROOKLYN, NEW YORK.

MOTOR-VEHICLE.

1,152,821.  Specification of Letters Patent.  Patented Sept. 7, 1915.

Application filed December 20, 1907. Serial No. 407,294.

*To all whom it may concern:*

Be it known that I, SAMUEL B. KURTZ, a citizen of the United States, residing in Brooklyn, county of Kings, and State of New York, have invented a new and useful Improvement in Motor-Vehicles, of which the following is a description.

This invention relates, generally, to motor-vehicles, and, particularly, to a new type of power-propelled vehicles which, by reason of certain peculiarities of construction and design, are distinguishable from the well-known automobile and the equally well-known motor-cycle.

Among the objects of my invention may be noted the following: to provide a high-power, high-speed motor-vehicle which will be light and capable of easy manipulation; to provide a motor-vehicle having all the advantages of the motor-cycle and none of its disadvantages, and all the advantages of an automobile and none of its disadvantages; to provide a new type of motor-vehicle having in combination certain advantageous features of an automobile and certain advantageous features of a motor-cycle, whereby the seating capacity of one and the high speed of the other are provided in a light and simple construction; to provide a motor-vehicle of high power and speed which can be easily manipulated to make short turns in narrow roadways and which is of such simple construction as to render it comparatively cheap of manufacture; to provide a vehicle of the type noted which is convertible for the purpose of running as a wheeled vehicle, or as a sleigh; to provide, in a motor-vehicle, a novel transmission mechanism including reversing means, and speed-changing means whereby three different speeds can be obtained; to provide a transmission mechanism wherein a given initial speed can be varied threefold; and to provide certain novel details of construction with reference to special parts of the vehicle, which render it certain and positive of manipulation, simple and cheap in construction, and capable of high speed and power.

With the above objects in view, and others which will be detailed during the course of this description, my invention consists in the parts, features, elements and combinations of elements and mechanisms as hereinafter described and claimed.

In order that my invention may be clearly understood, the same will be explained in connection with the accompanying drawings, wherein.

Figures 1, 3, 4, 5:
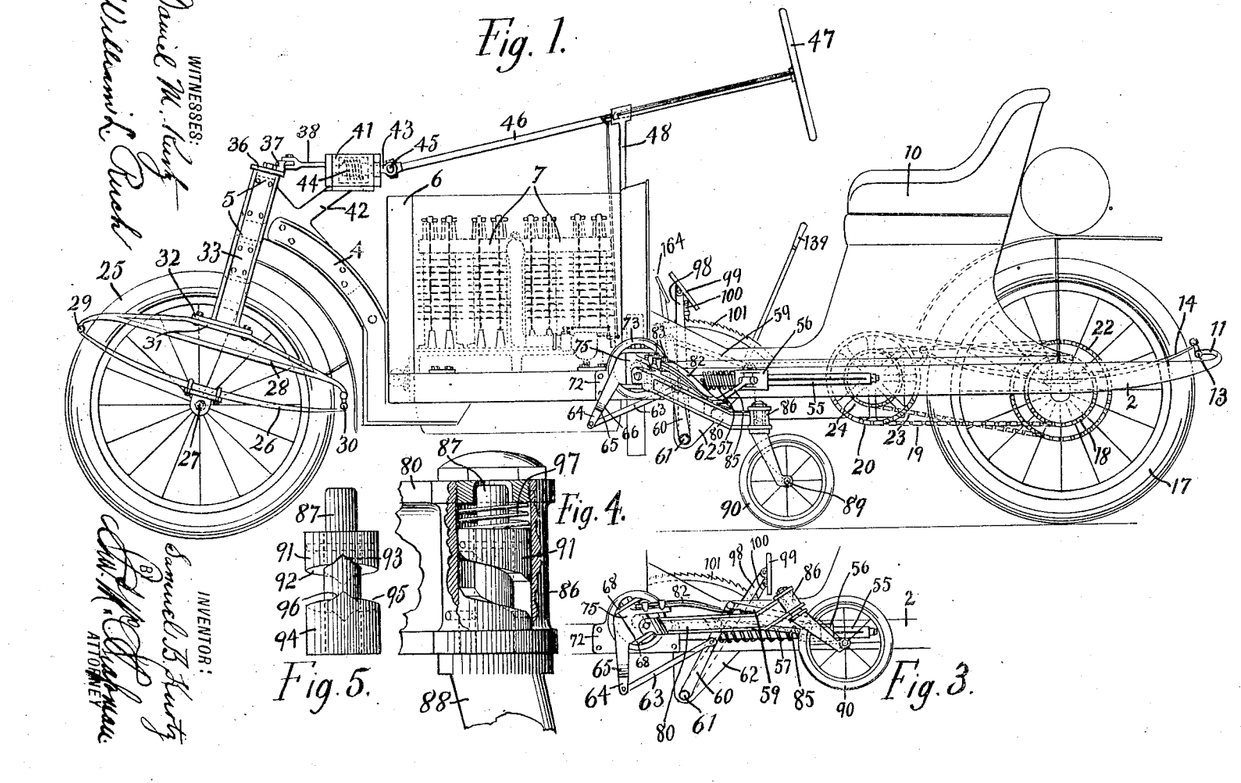
Figure 1 is a side elevation of a vehicle embodying my invention.
Fig. 3 is a side elevation of a portion of the vehicle showing the outrigger mechanism out of operative position.
Figs. 4, 5, 6, 7, 8 and 9 are details, partially in section and partially in elevation, of different portions of the outrigger mechanism.
Figures 2, 6, 7, 8, 9, 10, 11:
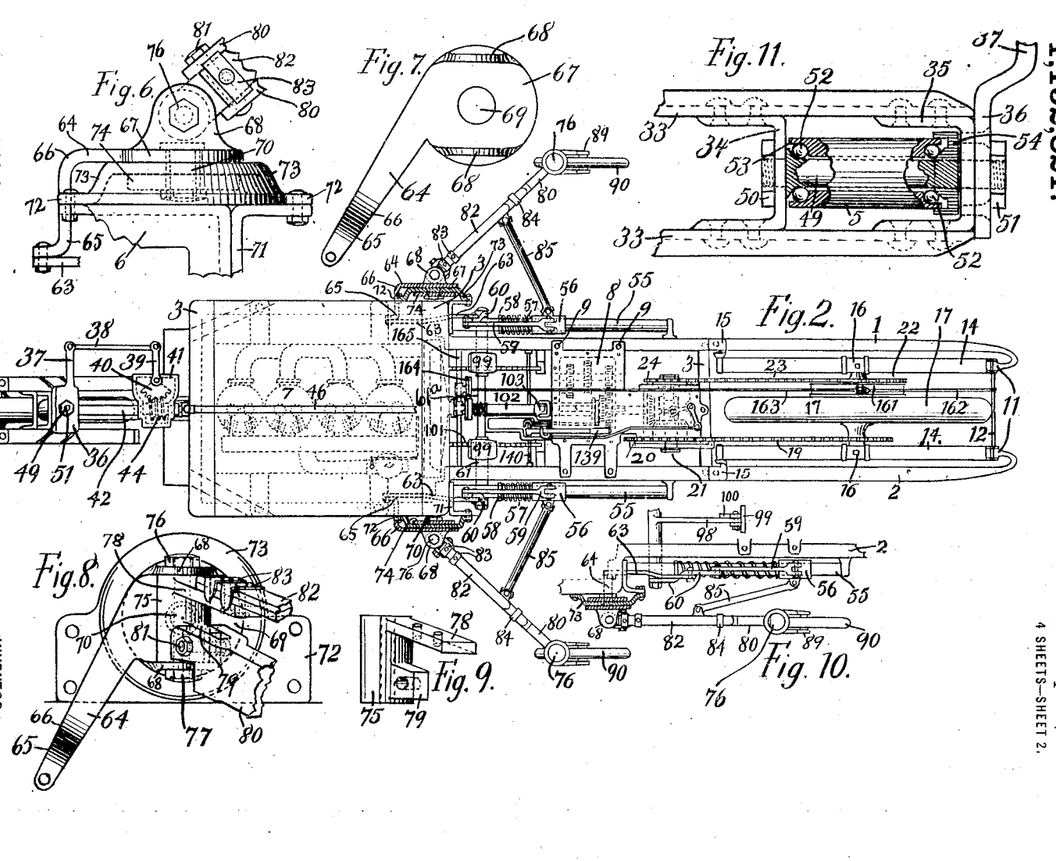
Fig. 2 is a top-plan view of the vehicle shown in Fig. 1, with the steering-hand-wheel and seat-structure omitted.
Fig. 10 is a top-plan of the outrigger mechanism showing the parts substantially in the position illustrated in Fig. 3.
Fig. 11 is a detail partially in elevation and partially in section of the steering-head.

By reference to Figs. 1 and 2 of the drawings, it will be seen that my new type of vehicle comprises a long, narrow frame consisting of the side-bars 1 and 2 having, at intervals along its length, the cross-bars 3, which connect and brace the same, and having at its forward end the upwardly and forwardly arched neck 4 carrying at its forward end the head 5, indicated by dotted lines in Fig. 1 and in detail in Fig. 11, which details will be presently described. The frame thus constructed supports the various parts of the vehicle such as the casing 6, within which is housed the motor, engine or other driving mechanism of the usual motor-vehicle, generally indicated by 7, including the cylinders, sparking device, etc. Just behind this casing 6, the transmission and speed-changing mechanism are supported upon the carrying-frame, generally indicated by 8, which frame has the general form and structure indicated, particularly, in Fig. 12, wherein it is shown as provided with the pairs of arms 8ª and 8ᵇ, which rest, respectively, upon the opposite bars 1 and 2 of the vehicle-frame see Fig. 2, the connection being made by suitable bolts or pins 9 passing through apertures 9ª in the said arms and into the said bars, as will be readily understood. The rear end of the carrying-frame is provided with the arm 8ᶜ, which is connected with the cross-bar 3 of the vehicle-frame, by means of a bolt passing through an aperture 9ᵇ therein and into the said bar. By this means, the carrying-frame is firmly secured in position and the vehicle-frame is additionally strengthened and braced both transversely and longitudinally.

Just over the transmission and speed-changing mechanisms is located the seat-structure of the vehicle, generally indicated by 10, which, obviously, can be made sufficiently large to seat either one person, or two persons side-by-side, said structure being supported at opposite sides upon the side-bars 1 and 2, as will be readily understood upon reference to Fig. 1. By bolting this seat-frame or body firmly to the side-bars, said vehicle-frame is still further strengthened and made rigid.

At their rear ends, the side-bars of the vehicle-frame, or chassis, are each upturned, as indicated at 11, and connected by a rod 12 affording at its opposite ends a pivotal support for the lower end of the links 13, the upper ends of which are connected to one end of the leaf-springs 14, the forward ends of which springs are pivotally connected to like lug pieces 15 rigidly secured, respectively, to the bars 1 and 2. Each of these springs is provided substantially midway of its length with the depending journal-bearings 16 for the rear driving-wheel 17 which, on one side, carries on its hub a small sprocket-wheel 18 connected by chain 19 to a large sprocket-wheel 20, splined to the shaft 21, forming part of the speed-changing mechanism presently described. On the opposite hub of the said wheel 17, a large sprocket-wheel 22 is fixed, which is connected by a chain 23 with a smaller sprocket-wheel 24 also splined to the shaft 21 at its opposite end. By this means, it will be readily understood that the vehicle can be driven at two speeds, according to which chain and set of sprocket-wheels is being driven by the transmission mechanism.

At its forward end, the vehicle is supported by the steering-wheel 25, the hub of which supports on opposite sides a spring-frame structure, each comprising the lower, upwardly-curved, leaf-spring 26 provided between its ends with the journal-bearing 27 for the wheel-axle, and the upper, rigid, substantially triangular frame 28, hinged at 29 at one end to the spring 26 and at its other end pivotally connected by a link 30 to the opposite end of said spring 26. The frame 28 is made in open form for lightness, but may be solid if desired; and has rigidly secured to its flattened top 31 the base 32 of the steering-frame bars 33, which latter, as shown in Fig. 11, are braced between their ends by the angular bracket 34 rigidly secured at opposite sides to the respective bars 33, and said bars being additionally braced at their upper ends by a like bracket 35 also rigidly secured at its opposite ends to said bars. To the upper end of the bracket 35 is secured the base 36 of a crank-arm 37 which, at its outer end, see Fig. 2, is pivotally connected to one end of a link 38 which, at its opposite end, is pivotally connected to an arm 39 forming part of the worm-segment 40 journaled in the box 41 carried by the arm 42 of the forwardly extending neck 4 of the vehicle. Within the box 41 is journaled the worm shaft 43, carrying the worm 44, which coöperates with the worm-segment 40, said worm-shaft being pivotally connected at 45 to the steering-rod 46, the rear end of which is provided with a hand-wheel 47 for turning the said rod, and said rod being journaled and sustained in the upright 48 secured to the casing 6, which incloses the engine.

Referring again to Fig. 11, the head 5 of the neck 4 of the vehicle-frame has extending through it the journal-pin 49 rigidly set at its lower end in the center of the angular bracket 34 and there held by the nut 50 screwed upon the end of said pin 49 and clamping the same rigidly in position. The upper end of the said journal-pin is screw-threaded for a considerable portion of its length and passes through angular bracket 35, and has on its upper end the nut 51, by means of which said pin is rigidly clamped to the said bracket 35 and the base 36 of the steering-crank. Between the head 5 and the journal-pin 49, and at opposite ends thereof, ball-bearings 52 are provided. To hold the balls in place, the journal-pin 49 and the head 5, at their lower end, are oppositely grooved or channeled, as at 53, so as to provide a proper closure and running bearing for the balls 52; while, at its upper end, the head 5 is likewise grooved to provide a ball-bearing, and the journal-pin 49 carries a bearing-cap 54 screwed upon said pin and adjustable for the purpose of tightening the bearing when required.

From the details so far set forth, it will be seen that a motor-vehicle has been provided wherein there is but a single steering-wheel which supports the vehicle at its forward end and but a single driving-wheel which supports the vehicle at its rear end, and that the vehicle, in all other respects, has the advantages of an automobile in the matter of its power, seating capacity, etc., and has all the advantages of a motor-cycle in the matter of its mobility and ease of manipulation.

In order to enable the vehicle to stand at rest without tilting, I provide an outrigger mechanism secured to opposite sides of the frame, which, in its details, will now be described with reference to Figs. 3 to 10. The bars 55 are rigidly supported on opposite sides of the frame of the vehicle and each bar supports a sliding-sleeve 56, which is normally held in position near the rear end of its supporting-bar by means of the coiled-spring 57 engaging at one end with one end of the sleeve and at its opposite end with a collar or pin 58 near the forward end of said bar. The top of the collar 56 has pivotally secured to it the rear end of the link 59, the forward end of which is pivotally connected to the upper end of the crank-arm 60 carried by one end of the transverse sleeve 61 journaled on bar 61ª fixed in the frame of the machine, or in depending brackets 62 carried by the latter, and said bar extends transversely of the frame to the opposite side where it carries a like sleeve 61 having a crank-arm 60. Substantially midway between its ends, each of the crank-arms 60 has pivotally secured to it one end of a link 63, the other end of which is pivotally secured to the lower end of a lever 64, which is curved outwardly at 65, so as to clear the frame of the vehicle, and then bent at a right-angle as at 66 and enlarged into a substantially circular plate 67 provided at top and bottom on one side with laterally extending ears 68. Centrally, the plate 67 is apertured at 69 for the passage of the pivot-bolt 70. The frame of the vehicle has rigidly secured to it the angular bracket 71, which has bolted to it one end of the frame 72, the opposite end of which frame is bolted to the frame or side-bars thereof, as clearly shown in Fig. 6. The frame 72 is centrally enlarged as at 73, to afford a sufficient bearing for the plate 67 of the lever 64, the bolt 70 passing through the aperture 69 of said lever-plate, through the center of the enlargement 73 of the frame 72 and through a washer 74, which latter bears against the back of the frame 72 and thus securely holds the lever in proper operative position. Between the ears 68 of the lever-plate 67 is journaled the bearing-sleeve 75 on the pin 76 suitably secured by means of nuts 77 to the said ears, said sleeve having at its upper end an arm 78 extending substantially at a right-angle thereto and at its lower end a similarly extending lug 79. To the lug 79 is pivotally secured the outrigger lever 80 by means of the pivot-bolt 81, and to the arm 78 are secured the leaf-springs 82 by means of the clamps and bolts 83, the opposite ends of said springs being held under loop 84 carried by the outrigger-lever 80 near its forward end. The outrigger-lever has pivotally connected to it one end of a radius-bar 85, the opposite end of which is pivotally connected to the side of the sliding-sleeve 56, the said outrigger-lever being thus moved according to the movement of the said sleeve 56. Referring now to Figs. 4 and 5, it will be seen that the outer end of the outrigger-lever 80 is provided with the tubular enlargement or bearing 86, in which is journaled loosely the journal-pin 87 of the traction-wheel frame 88, which is bifurcated and provided at its lower end with angular extensions 89 affording journal bearings for the axle of the wheel 90, the said wheel operating within the fork of the said frame 88. The journal-pin 87 has fixed to it within the bearing 86 a cylinder 91, the lower face of which is provided with a cam-surface 92 terminating in a V-shaped notch 93; and also within said bearing 86 and fixed thereto and loosely surrounding the journal-pin 87 is a complemental cylinder 94 provided on its upper face with a correspondingly shaped cam 95 terminating in the V-shaped projection 96 adapted to enter the V-shaped notch 93 of the cylinder 91. Normally, the traction-wheel frame 88 is free to turn within the bearing 86, as will be readily understood, and by gravity said frame will naturally fall away from the bearing 86, until the cam-surface of the cylinder 91, carried by the pin 87, engages with the cam-surface 95 of the cylinder 94, and from the movement of the vehicle, the frame with its traction-wheel 90 will naturally turn until the coöperating projection 96 and notch 93 register the one with the other. This will hold the outrigger-frame 88 from any movement relatively to the lever 80. In order to aid gravity and avoid the possibility of the friction within the bearing 86 preventing the proper action of the traction-wheel frame, a coiled-spring 97 surrounds the upper end of the pin 87 and engages at one end against the top of the bearing 86 and at the other against the top of the cylinder 91, thus normally tending to force the latter downwardly within the bearing 86. As will be presently described, when the wheel 90 goes into traction, the cylinder 91 will compress the spring within the bearing 86, thus putting said spring under tension. In order to operate the outrigger mechanism, each sleeve 61 is provided between its ends with an upwardly extending crank-arm 98, which is provided at its upper end with a pivotally supported foot-rest 99 to the bottom of which is pivotally connected the pawl 100, the lower end of which engages the teeth of a segmental ratchet-bar 101 rigidly secured in coöperative position to the frame of the machine. The normal position of the outrigger mechanism is shown in Figs. 3 and 10, the wheels 90 being out of traction and drawn in toward the side of the vehicle. The operative position of the outrigger mechanism is shown in Figs. 1 and 2, the wheels being in traction. By this outrigger mechanism, it will be readily understood that the vehicle, when standing, or running at low speed,—as in starting or stopping,—will be maintained rigidly and positively in a perfectly horizontal position, the same as any automobile of the common four-wheel variety; but, after speed has been obtained, these outriggers are drawn in, as shown in Figs. 3 and 10, as they are no longer needed, except, possibly, according to the lean of the vehicle, or in an emergency, when either or both can be readily and quickly thrown out or spread as may be necessary.

Figures 12, 13, 14, 15, 16, 17, 18, 19, 20:
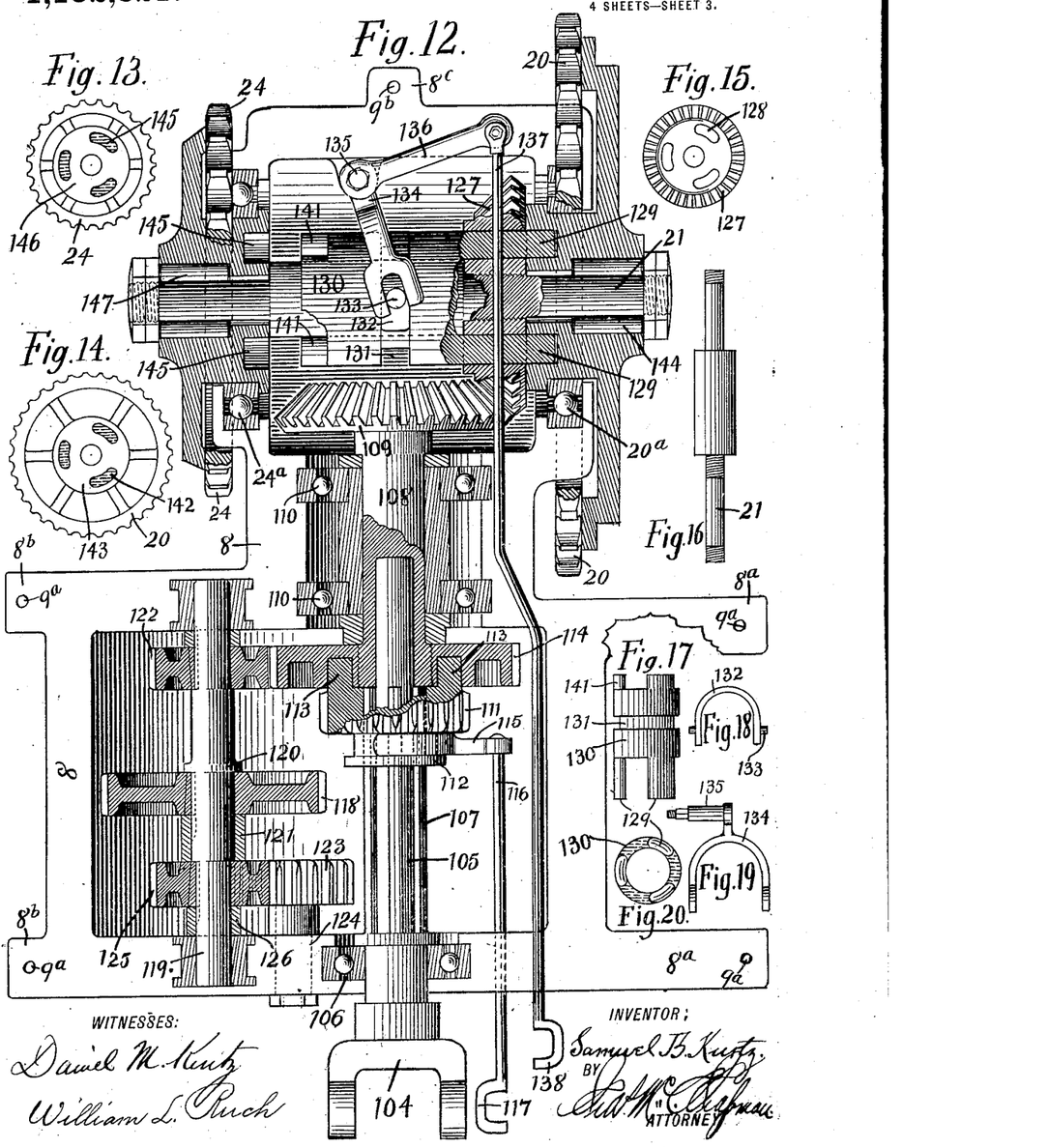
Fig. 12 is an enlarged view partially in section and partially in plan of the speed-changing and transmission mechanism.
Figs. 13 and 14 are views in elevation of the driving sprocketwheels.
Fig. 15 is an elevation of one of the driving bevel-gears.
Fig. 16 is an elevation of the driving-shaft of the speed-changing mechanism.
Fig. 17 is an elevation of the speed-changing clutch.
Fig. 18 is an elevation of the sliding-yoke of the speed-changing clutch.
Fig. 19 is an elevation of the clutch-operating yoke-lever.
Fig. 20 is an end view of Fig. 17.

The speed transmission and driving mechanisms of my vehicle are clearly shown in Figs. 12 et seq., and will now be described. Of course, it is understood that the engine, or other motive power, which may be carried in the casing 6, will actuate, in any suitable manner, the driving-shaft 102, as by the usual clutch which can be manipulated in usual manner, shown by dotted lines in Fig. 2, said shaft, at its rear end, being pivotally jointed at 103 to the bifurcated end 104 of the shaft 105 journaled near its front end in the ball-bearing 106 at the front end of the carrying-frame 8. The shaft 105 is provided with radially-projecting splines 107, extending to within a short distance of the rear end thereof, the extreme rear end of said shaft being received in a central bore at the forward end of the shaft 108 which, at its rear end, is provided with the bevel transmission-gear 109. The shaft 108 is journaled in the carrying frame 8 in any suitable manner and provided with ball-bearings 110 of any suitable construction. The connection between the shaft 105 and the shaft 108 is such as to enable one to run freely and independently of the other, and these shafts constitute a two-part transmission-shaft connected by a clutch, for a purpose presently described. The shaft 105 is provided with a gear-clutch 111, the forward end of which is formed into a collar 112 and the rear end of which is provided with rearwardly-projecting prongs 113 which enter apertures provided in the face of gear 114, which is fixed upon the forward end of the shaft 108. By reason of this construction, the clutch-gear 111 can be made to drive the gear 114 from the shaft 105, and in turn drive the shaft 108 and the bevel-gear 109. When desired, the clutch-gear 111 can be moved from engagement with the gear 114 by means of the yoke 115, which embraces the collar 112 of the clutch-gear 111, and which yoke is rigidly connected to the rod 116, the forward end of which is provided with the hook-portion 117 by means of which it may be manipulated through the medium of a hand-lever within control of the operator, as usual. In this manner, the clutch-gear 111 can be made to drive the bevel-gear 109 from the engine-shaft, for the full speed of the latter. If it be desired to change the speed of the bevel-gear 109 and, consequently, the speed of the vehicle, the clutch-gear 111 can be slid along the shaft 105 into engagement with the gear 118 carried by the countershaft 119 suitably journaled at opposite ends in the carrying-frame 8, said gear 118 being keyed upon the shaft 119 and held in fixed position by means of the shoulder 120 on said shaft and a collar 121 at the opposite side of said gear. At the rear end, the shaft 119 is provided with the pinion 122 which meshes with the gear 114, shaft 108 being thus driven by the clutch-gear 111, with a decrease of speed, owing to the difference in size of the gear 118 and the pinion 122. If it is desired to reverse the drive of the bevel-gear 109, the clutch-gear 111 can be slid still farther forward along the shaft 105 until brought into mesh with the pinion 123 carried by the stud-shaft 124 suitably journaled in the carrying-frame 8, said pinion 123 meshing with the pinion 125 keyed to the shaft 119 and held in fixed position by the collar 121 at one side and the collar 126 at the other side, which latter abuts against the journal-bearing at that end of the shaft. By interposing the pinion 123 between the pinion 125 and the clutch-gear 111, the shaft 108 and its gear 109 are reversed in motion, as will be readily understood. Thus, by a compact arrangement of gears and transmission-shafts, the speed of drive of the vehicle can be changed, or varied, and the movement of said vehicle can be reversed. In order that the action of this reversing and driving mechanism may be imparted to the vehicle, the sprocket-shaft 21, heretofore referred to as being journaled transversely in the rear portion of the carrying-frame 8, has suitably fixed to it the bevel-gear 127, which meshes with the bevel-gear 109. The gear 127 is provided around its axis, in the web-portion thereof, with a series of elongated slots 128 through which pass and operate the pins 129 of a clutch-sleeve 130, said sleeve being provided substantially centrally thereof with a circumferential groove 131, in which is set a yoke-slide 132 provided with oppositely-extending pins 133 for engagement by the bifurcated ends of a yoke-lever 134 fulcrumed at 135 in a bearing of the carrying-frame 8. To the fulcrum-pin 135 of said yoke-lever 134 is connected a crank-arm 136, the outer end of which is pivotally connected to a rod 137, which extends forward to convenient position for the operator to manipulate the same through the medium of the hook 138 at the forward end of said rod, which, as shown in Fig. 2, is engaged by the hand-lever 139 journaled in the frame of the vehicle through the medium of the transverse rod 140. The opposite end of the clutch-sleeve 130 is also provided with clutch-pins 141 which coöperate with elongated slots in gear 24 as will be presently described. The pins 129 extend through the bevel-gear 127 into the elongated, imperforate slots 142 formed in the face of the hub 143 carried by the sprocket-wheel 20, heretofore referred to, said sprocket-wheel being journaled upon the shaft 21 and capable of running on cylindrical, anti-friction bearings 144. In this manner, the bevel-gear 127 and the sprocket 20 are firmly clutched together so that the bevel-gear 109 may drive the same, the motion of the sprocket-wheel 20 being, as heretofore noted, transmitted through the chain 19 to the sprocket-wheel 18 carried by the driving traction-wheel 17 of the vehicle. When the sprocket-wheel 20 is thus clutched to the shaft 21 a running bearing is afforded by the ball-bearing structure shown in Fig. 12 and indicated by 20ª. By shifting the clutch-sleeve 130 so as to withdraw the pins 129 from the slots 142 of the sprocket-wheel 20, the pins 141 will be caused to enter the imperforate slots 145 formed in the hub 146 of the sprocket-wheel 24 journaled on the opposite end of the shaft 21 and capable of running on the cylindrical, anti-friction bearings 147. Through this sprocket-wheel 24, and the sprocket-chain 23, motion is imparted to the rear driving-wheel 17 by medium of the sprocket-wheel 22 carried by the hub of said wheel. When sprocket-wheel 24 is thus clutched to shaft 21, it runs on the ball-bearings 24ª in all respects the same as the bearing 20ª. By this construction, it will be readily understood that, whatever may be the speed of the shaft 108, as imparted by the transmission mechanism from the engine, that speed may be changed by shifting the clutch-sleeve 130, as described; and the difference in size of the several sets of sprocket-wheels will, of course, control the speed of drive of the vehicle. Referring to Fig. 2, it will be seen that, when the lever 139 is shifted forward for the purpose of changing the drive or speed of the vehicle at the sprocket-wheels, said lever is in position such that it can be readily shifted laterally so as to engage the hook 117 on rod 116, thus also enabling the clutch-gear 111 to be shifted by a further forward movement of said lever. By this means, the motion of the vehicle can be reversed on the lowest speed, or the low speed of the sprocket 24 can be still further reduced by causing the clutch-gear 111 to coöperate with the gear 118

Having thus described the details of my motor-vehicle, it will be readily understood that, when the machine is at a standstill, the outriggers will be spread so as to bring the traction-wheels 90 into contact with the traction-surface, whereupon the vehicle will be rigidly supported in a horizontal position, in all respects the same as an ordinary automobile of the four-wheel type; and these outriggers will remain spread until a sufficient speed has been attained, when they will be drawn in beside the vehicle and out of traction, by simply rocking the foot-plate 99 on the crank-arm 98, thereby lifting the pawl 100 from the ratchet-segment 101, and allowing the springs 57 to expand and push the sleeve 56 rearwardly along the guide-bar 55, this action resulting in simultaneously lifting the traction-wheels 90 from the traction-surface and drawing the outrigger-levers 80 into position substantially parallel with the frame of the vehicle, as illustrated in Fig. 10. This action will release the spring 97 and enable it to expand within the outrigger-bearing 86, thus depressing the cam 91 into contact with the cam 94, the surfaces of which will readily register the one with the other, resulting in holding the traction-wheel 90 in the position clearly shown in Fig 3, without possibility of its swinging either inwardly or outwardly. The motor, having been started in any of the usual ways, the driving-shaft 102 will be brought into operation through the usual clutch mechanism, whereupon the transmission shaft 105 will, with the clutch-gear 111, in the position shown in Fig. 12, drive the shaft 108 and bevel-gear 109, the latter in turn driving the bevel-gear 127, thus rotating the shaft 21. If, now, the clutch-sleeve 130 be in the position shown in Fig. 12, with the clutch-pins 129 passed through the gear 127 and set within the slots 142 of the sprocket-wheel 20, the latter will be driven and its motion transmitted through chain 19, and the sprocket-wheel 18 carried by the hub of the driving-wheel 17, and the vehicle thus propelled. The operator will control the direction of movement of the vehicle by the hand-wheel 47 and the steering-gear connections to the head of the machine and the steering-wheel 25. To change or lower the speed of the vehicle, the clutch-sleeve is shifted, by rod 137 and its connected lever 136, so as to lock the sprocket-wheel 24 to shaft 21, as heretofore set forth. With the vehicle well under way, the outriggers will be drawn in, as previously noted, and the vehicle will be found to run easily on its two wheels, with perfect balance and poise. If, at any time during the running of the vehicle, it sways a little too much to one side or the other, a perfect equilibrium can be reëstablished by simply throwing out one or the other, or both, of the outriggers, so as to steady the vehicle. And, when it is desired to stop, and after the power has been thrown out, and the speed of the vehicle has been reduced by the application of the brake, or otherwise, the outriggers will be thrown out, whereupon the vehicle can come to a stop in a perfectly horizontal position.

Figures 21, 23:
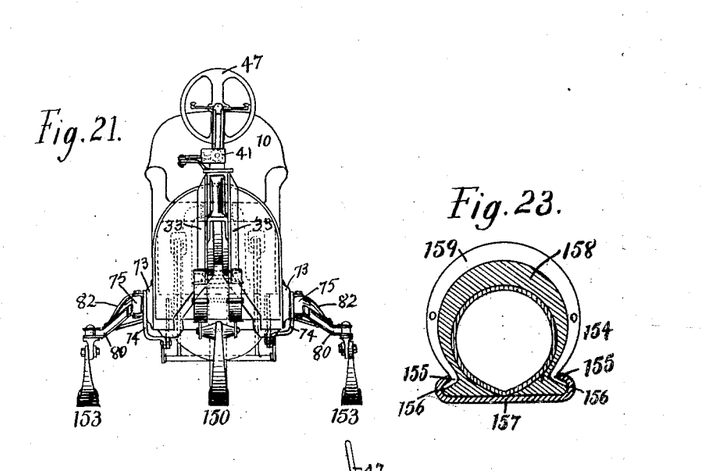
Fig. 21 is a front elevation of my motor-vehicle to which runners have been adapted in place of the steering and outrigger-wheels.
Fig. 23 is an enlarged detail showing in section, substantially on the line 23—23 of Fig. 22, the construction of the driving-wheel of the vehicle shown in Fig. 22.
Figure 22:
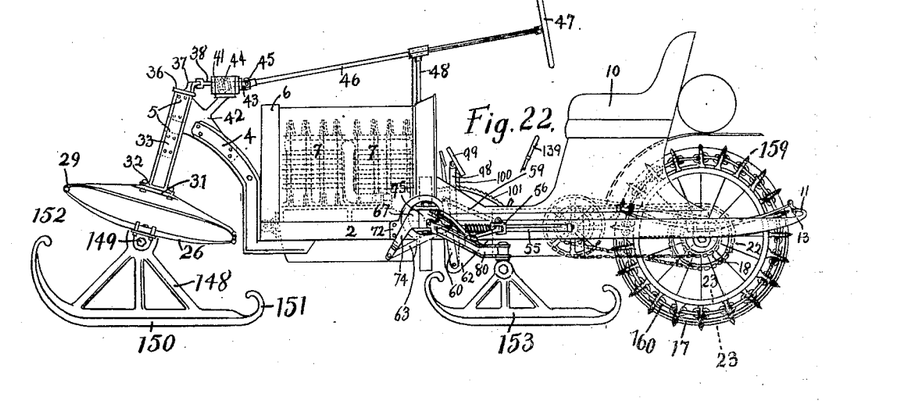
Fig. 22 is a side elevation of the vehicle shown in Fig. 21.

On reference to Figs. 21, 22 and 23, it will be seen that my motor-vehicle can be readily converted into a sleigh by simply applying to the steering-head, in place of the steering-wheel, a runner which, in the form shown, consists of a substantially triangular frame 148, journaled at its upper end to the spring 26, substantially as indicated at 149, the runner 150, applied to said frame, being extended rearwardly and curved upwardly at 151 and also forwardly and extended quite a distance upwardly at 152 for the purpose of enabling it to pass over obstructions, as will be readily understood. A similar runner-frame, generally indicated by 153, is also applied to each of the outrigger-levers 80, in place of the traction-wheels 90, the rest of the construction remaining unchanged. The rear driving-wheel 17 of the vehicle has applied to it a traction-device consisting of a plurality of strong, metallic hoops 154 outwardly turned at their ends to form flanges 155, which enter under the flanges 156 of the rim 157 of the wheel, so as to be gripped thereby and firmly clenched in place, as the tire 158 is inflated. Each of these traction-hoops 154 is formed around its periphery into a sharp rim 159 which, obviously, will take a firm grip and have a substantial traction drive when the wheel is rotated, resulting in positively driving the vehicle. The several hoops 154 are firmly linked together by means of the chain 160, extending from hoop to hoop around the series, thus preventing the angular strain on the said hoops from loosening the same on the rim 157. This traction means may be applied to the wheel as a removable device, or an extra wheel can be provided of the form shown, as a substitute for the driving-wheel 17. In other respects, the vehicle remains unchanged, when converted from an automobile into a sleigh.

Any suitable sparking-device can be applied to the vehicle to produce combustion and a suitable brake mechanism can be applied in the usual manner, Fig. 2 showing a simple form of brake mechanism applied to the hub of the rear wheel, and consisting of the usual brake-band construction generally indicated by 161, one end of which is connected by the rod 162 to the transverse bar or brace 12 of the machine and the other end of which is connected to the rod 163, which extends forward to convenient position for the foot of the operator to manipulate the same through the medium of the pedal-lever 164, journaled upon the bar 165 extending transversely of the frame of the machine.

Having thus described my invention, what I claim and desire to secure by Letters Patent is:

1. A motor-vehicle having in combination, a frame supported at its rear end upon a driving-wheel and at its front end a steering-wheel; means for journaling said steering-wheel on the frame; means for manipulating the steering-wheel; and means for actuating the driving-wheel including a transmission-shaft extending longitudinally of the vehicle frame and having splined thereto a clutch-gear transmission mechanism coöperating with said clutch-gear including two sprocket-wheels, means whereby one or the other of said sprocket-wheels may be positively driven, and connections between the sprocket-wheels and the driving-wheel.

2. A motor-vehicle having in combination, a frame supported at its rear end upon a driving-wheel and at its front end upon a steering-wheel; means for journaling said steering-wheel on the frame; means for manipulating the steering-wheel; means for actuating the driving-wheel including a two-part transmission-shaft; a clutch-device between the two parts of said shaft; a second shaft arranged at an angle to the said transmission-shaft; sprocket-wheels carried by said second shaft; a sliding-clutch coöperative with said sprocket-wheels, means connecting the said transmission-shaft with the said second shaft; and connecting means between said sprocket-wheels and the driving-wheel.

3. A motor-vehicle having in combination, a frame supported at its rear end upon a driving-wheel and at its front end upon a steering-wheel; means for journaling said steering wheel on the frame; means for manipulating the steering-wheel; means for actuating the driving-wheel including a two-part transmission - shaft; a counter - shaft paralleling the latter; gears carried by said counter-shaft; a sliding-clutch-gear carried by one part of said transmission-shaft; means connecting the other part of said transmission-shaft with the said clutch-gear and the said countershaft; means whereby the said clutch-gear may be moved into coöperation with one of the gears on the said countershaft for changing the speed transmitted by the two-part transmission-shaft; and a motor for driving the two-part transmission shaft.

4. A motor vehicle having in combination, a frame supported at its rear end upon a driving-wheel and at its front end upon a steering-wheel; means for journaling said steering-wheel on the frame; means for manipulating the steering-wheel; means for actuating the driving-wheel including a transmission shaft; a shaft arranged at a right-angle thereto; gearing connecting the two said shafts whereby one may be driven by the other; sprocket-wheels carried by the latter shaft; a clutch-device coöperative with both of said sprocket-wheels whereby the gearing may drive either of said sprocket-wheels; and a motor for driving the transmission-shaft.

5. A motor-vehicle having in combination, a frame supported at its rear end upon a driving-wheel and at its front end upon a steering-wheel; means for journaling said steering-wheel on the frame; means for manipulating the steering-wheel; means for actuating the said driving-wheel including a transmission-shaft in two parts independently operable; a clutch and gearing connecting the driving-wheel and one part of said shaft; means whereby the two parts of said shaft may be coupled and uncoupled at will; means whereby the speed of one part of said shaft may be changed at will; and means whereby the movement of said part may be reversed at will.

6. A motor-vehicle having in combination, a frame supported at its rear end upon a driving-wheel and at its front end upon a steering-wheel; means for journaling said steering-wheel on the frame; means for manipulating the steering-wheel; means for actuating said driving-wheel including a transmission shaft in two parts independently operable; a clutch and gearing connecting the driving-wheel and one part of said shaft; means whereby one part of said shaft may be caused to drive the other part; and means whereby, at will, one part of said shaft may be reversed.

7. A motor-vehicle having in combination, a frame supported at its rear end upon a single driving-wheel and at its front end upon a single traction-device; and means for driving the vehicle including a transmission-shaft; a driven shaft at a right-angle thereto; sprocket-wheels of different size carried by the latter shaft; connecting means between the two shafts whereby one may drive the other; means for changing the speed of the transmission-shaft; and means whereby the speed imparted to the driven shaft may be changed in transmission to the driving-wheel.

8. A motor-vehicle having in combination, a frame supported at its rear end upon a driving-wheel and at its front end upon a single traction-device; means for driving the vehicle including a transmission-shaft; a shaft driven thereby; speed changing devices in coöperation with the driven shaft including two power wheels, a sliding clutch coöperating with both power wheels and driving gears; and speed changing devices in coöperation with the transmission-shaft.

9. A motor vehicle having in combination, a frame supported at its rear end upon a driving-wheel and at its front end upon a single traction-device; means for driving the vehicle including a transmission-shaft; a shaft driven thereby and arranged at an angle thereto; and means whereby, with a given speed of the transmission shaft, two different speeds of the vehicle can be had through said driven shaft, said means including two driving-wheels, a sliding-clutch coöperating with both wheels and driving-gears.

10. A motor-vehicle having in combination, a frame supported at its rear end upon a driving-wheel and at its front end upon a single traction-device; means for driving the vehicle including a two-part transmission-shaft; a shaft driven thereby; means whereby a given speed of one part of the transmission-shaft can be changed to a different speed in the other part of said shaft; and means whereby the speed imparted by said transmission-shaft to the driven shaft can be still further varied at will.

In testimony whereof I have hereunto signed my name in the presence of two subscribing witnesses.

SAMUEL B. KURTZ.

Witnesses:
FLORENCE ATEN IVES,
CHAS. McC. CHAPMAN.